G. SUNDBY.
RELIEF MECHANISM FOR WATER MOTORS.
APPLICATION FILED DEC. 23, 1912.

1,109,153.

Patented Sept. 1, 1914.
3 SHEETS—SHEET 3.

UNITED STATES PATENT OFFICE.

GUDMUND SUNDBY, OF GLÖSHAUGEN, NEAR TRONDHJEM, NORWAY.

RELIEF MECHANISM FOR WATER-MOTORS.

1,109,153.  Specification of Letters Patent.  Patented Sept. 1, 1914.

Application filed December 23, 1912. Serial No. 738,275.

*To all whom it may concern:*

Be it known that I, GUDMUND SUNDBY, a subject of the King of Norway, residing at Glöshaugen, near Trondhjem, Norway, have invented certain new and useful Improvements in Relief Mechanism for Water-Motors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to relief mechanism for water motors and has for its object to regulate the pressure and velocity of the water to prevent the water admission device of the water motor from being moved too fast, and thereby causing an excessive variation of pressure in the water pipe if the movement of the relief valve, for any reason, should not correspond to the movement of the water admission device.

In known systems, the tachometer controls the servo-motor for the water admission device of the power engine, and the movement of the relief valve is controlled from the admission device through an inserted cataract. Should the cataract fail, the relief valve will not be opened when the water admission device is closed. Increased safety has been sought by introducing a second cataract, the motion of which is dependent on the relief valve and which will prolong the duration of the closing, if the relief valve should not open. Such a system, however, is complicated and difficult to adjust and consequently uncertain.

According to the present invention, positive operation is obtained by the action of the governor effecting the movement of the relief valve which movement controls the admission of water to the power engine in such manner, that the period of regulation will be prolonged if the relief valve does not move as quickly as it should.

The admission of water to the power engine may be controlled by any part, adapted therefor, of the motive mechanism of the relief valve, if care be taken, that the necessary dependency of the motion of the relief valve is present.

Figure 1:
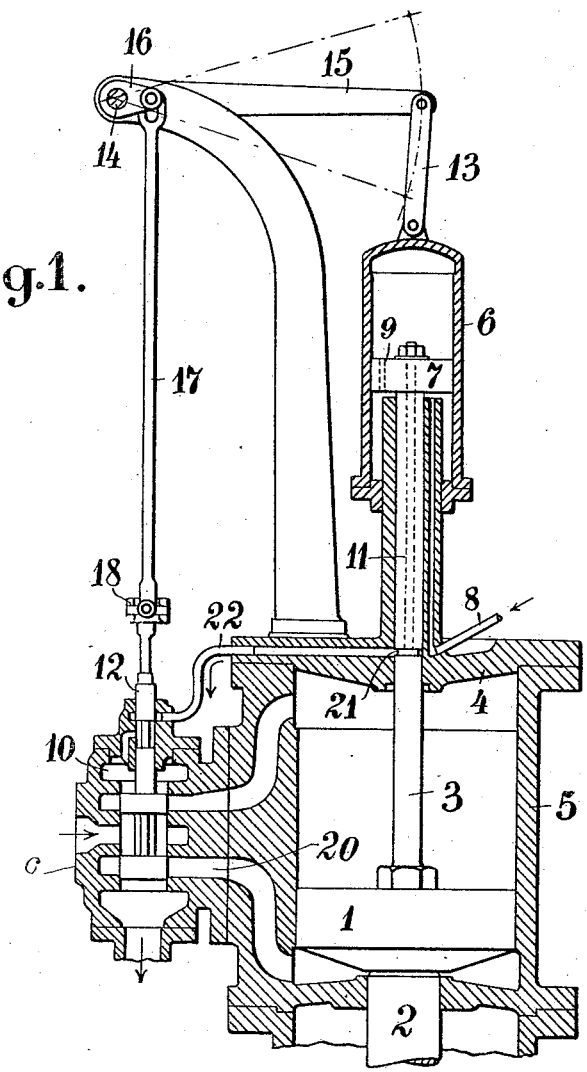
Figure 2:
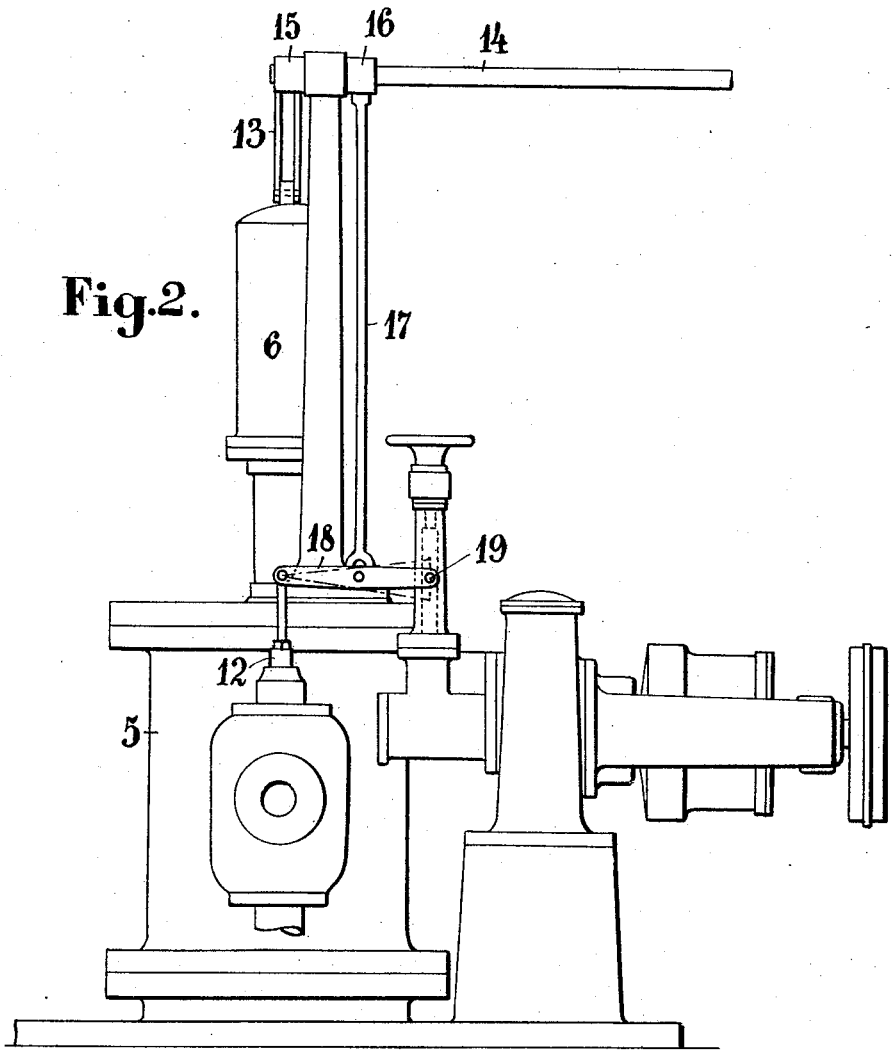
Figure 3:
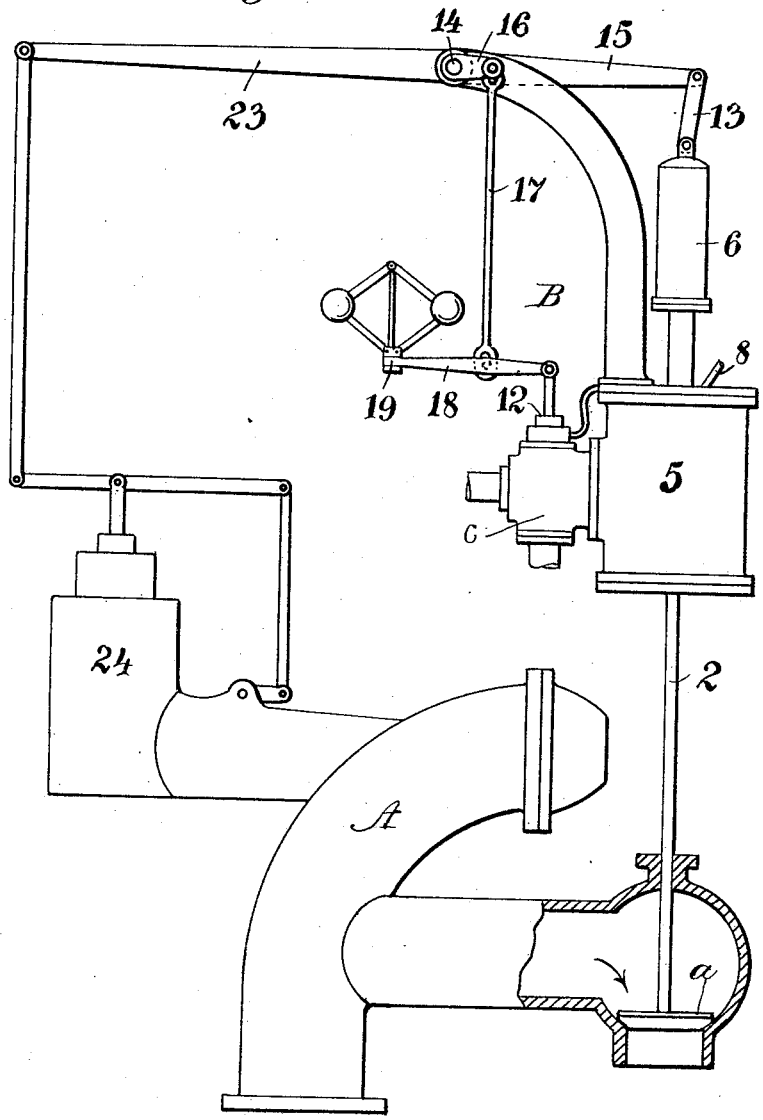

An embodiment of the invention is illustrated in the accompanying drawings in which—Figure 1 is a vertical section through a portion of the regulating mechanism. Fig. 2 is a side view of the same, and Fig. 3 is an elevation partly in section of the regulating mechanism connected to the water admission device.

In the embodiment illustrated, the water admission device A (Fig. 3) of the power engine, not shown, is provided with a relief valve $a$, which is so connected by a rod 2 to a piston 1 (Fig. 1) of the regulating device B, that the valve will be opened when the piston is raised and closed when the piston is lowered. The piston 1 works in a cylinder 5 of the regulating device and has a rod 3 which extends through the cylinder head 4 and carries a piston 7 contained within a cataract cylinder 6 which is slidably mounted on a cylindrical extension of the head 4. Oil under pressure is supplied from a pressure tank, not shown, through a pipe 8 to the underside of the piston 7 of the cataract. The lower portion of the cylinder 6 communicates with the upper portion through a small passage 9 in the piston and the upper portion of said cylinder is vented under certain conditions through a longitudinal passage 11, and an annular passage 21 in the rod 3, passage 22 in the cylinder head 4, which latter passage connects with an outlet 10 in the casing of valve 12. When the valve 12 is in the middle position the outlet 10 will be open sufficiently to allow the quantity of oil that leaks through the passage 9 to flow out and make the pressure on the upper side of the piston 7 exactly balance the pressure on the underside so that the cataract will remain at rest. The valve 12 can only open the outlet 10 when the relief valve $a$ is closed and the piston 1 is in its lowest position. As soon as the piston 1 is raised, the connecting passage 22 is closed by the rod 3. The cataract cylinder 6 is connected by a link 13 to a lever 15 fixed on a rock shaft 14 on which is fixed a short arm 16 that is connected by a rod 17 to a two armed lever 18, one arm of which is connected with the valve 12 and the other arm connected with a centrifugal governor 19 of the power engine. On the shaft 14 is fixed a third lever 23 which through links and levers, is connected to the regulating slide of a servo-motor 24 for regulating the admission of water to the power engine through the water admission device A.

The mechanism above described operates as follows: When the parts are in the position shown, the relief valve *a* is closed, and the valve 12 is in position to permit sufficient liquid to pass from the upper side of the piston 7 to balance the cataract. If now the load on the power engine is suddenly diminished, the speed of the engine will increase and the centrifugal governor of the engine will raise the end of the lever 18 connected to it and depress the other end of said lever. The rocking of the lever moves the valve 12 downward, from the position shown, closing the outlet 10 and opening the pressure inlet 20 in the valve casing *c* so that pressure fluid can flow through passage 20 to the underside of the piston 1 and cause the latter to move upward and open the relief valve *a*. The cataract cylinder 6 will be moved upward, simultaneously by the rod 3, raising the lever 15 which will rock the shaft 14 and through the medium of arm 16 and rod 17 raise that end of lever 18 which is connected to the valve 12 and return the latter to its middle position. The rocking of the shaft 14 will through the medium of the third lever 23 and its link and lever connections operate the servo-motor 24 so as to cause the latter to close the admission of water to the engine. The pressure liquid supplied by the pipe 8 will now leak through the passage 9 to the upper side of the piston 7 and as the operative area of said piston is larger on the upper side than on the lower side, the cataract will move slowly upward and by means of the levers 15, 18, the valve 12 is raised, admitting pressure to the upper side of the piston 1 so that the latter will move downward and slowly close the relief valve *a*. The cataract will follow the downward movement of the rod 3 and move the valve 12 downward again. This operation will continue until the relief valve is entirely closed. The valve 12 will then remain in its middle position and the cataract come to rest. The movement of the relief valve may be changed by altering the size of the passage 9. If the load on the engine is increased, the operation will be reversed, if the safety valve is not closed. The governor will cause the piston 1 to move downward and the servo-motor operated to open the water admission device. If the relief valve is closed the valve 12, on moving upward, will admit pressure to the upper side of the piston 1, but the latter cannot move farther downward and will remain at rest. Moreover, the valve 12 will open the outlet from the upper side of the piston 7 and the cataract will move downward and operate the device for admitting water to the engine in a corresponding manner to that above described so that said device will be opened. Should the relief valve not open if the load on the engine is suddenly diminished, the admission of water to the engine cannot be closed more quickly than the cataract moves upward, and this speed may be regulated completely with the size of the passage 9. Should this passage 9 become choked, the relief valve will remain open, but there is no risk that either the latter or the water admission device will be closed too quickly. Thus a regulating arrangement is provided, which cannot cause too great an increase of pressure in the pipe; at any rate this cannot occur except by accident, such for instance by the breaking of rods or the like.

I claim—

1. In a relief mechanism for water motors, the combination with a water admission device having a servo-motor and a relief valve, of means operated by the governor of the motor for actuating the relief valve, and means operated by the valve actuating means for operating the servo-motor.

2. In a relief mechanism for water motors, the combination with a water admission device having a servo-motor and a relief valve, of a power cylinder, a piston therein connected with the relief valve, means operated by the governor of the motor for controlling the admission of a pressure medium to the power cylinder, and means operated by the piston to actuate the servo motor.

3. In a relief mechanism for water motors, the combination with a water admission device having a servo motor and a relief valve, of a power cylinder, a piston therein connected with the relief valve, a slide valve operated by the governor of the water motor to control the admission of a pressure medium to the power cylinder, and a cataract connected with said piston and servo-motor to control the admission of a pressure medium to the latter.

4. In a relief mechanism for water motors, the combination with a water admission device having a servo motor, and a relief valve, of a power cylinder, a piston therein connected with the relief valve and controlled by liquid pressure, a cataract connected with the piston, a controlling member for the servo motor, operating means connecting the cataract and controlling member, a lever connected with said operating means and the governor of the water motor, and means operated by said lever for regulating the supply of pressure liquid to said power cylinder.

5. In a relief mechanism for water motors, the combination with a water admission device having a servo-motor and a relief valve, of a power cylinder, a piston therein having a rod connected to the relief valve, a valve for controlling the admission of a pressure fluid to the cylinder for reciprocating the piston, a cataract comprising an auxiliary piston on said rod, a cylinder containing the auxiliary piston, a pressure fluid inlet on one side of the latter, an outlet channel from the other side of said auxiliary piston, and means to close said channel simultaneously with the admission of pressure fluid to the power cylinder.

6. In a relief mechanism for water motors, the combination with a water admission device having a servo-motor and a relief valve, of a power cylinder, a piston therein having a rod connected to the relief valve, a valve for controlling the admission of a pressure fluid to the cylinder for reciprocating the piston, a cataract comprising an auxiliary piston on said rod, a cylinder containing the auxiliary piston and having a pressure fluid inlet on one side of the latter, an outlet channel from the other side of said auxiliary piston, means to close said channel simultaneously with the admission of pressure fluid to the power cylinder, and means actuated by the cataract to control the admission of a pressure fluid to the servo motor.

In testimony that I claim the foregoing as my invention, I have signed my name in presence of two subscribing witnesses.

GUDMUND SUNDBY.

Witnesses:
ANTON MEYER,
CARL BASPI.

Copies of this patent may be obtained for five cents each, by addressing the "Commissioner of Patents, Washington, D. C."